United States Patent
Zang

[19]

[11] Patent Number: 5,839,833
[45] Date of Patent: *Nov. 24, 1998

[54] HYDRODYNAMIC BEARING HAVING LUBRICANT PARTICLE TRAPS

[75] Inventor: Yan Zang, Milpitas, Calif.

[73] Assignee: Quantum Corporation

[*] Notice: This patent issued on a continued prosecution application filed under 37 CFR 1.53(d), and is subject to the twenty year patent term provisions of 35 U.S.C. 154(a)(2).

[21] Appl. No.: 622,644

[22] Filed: Mar. 26, 1996

[51] Int. Cl.⁶ .............................. F16C 32/06; F16C 33/74
[52] U.S. Cl. ........................... 384/107; 384/123; 384/132
[58] Field of Search ...................... 384/100, 113, 384/115, 120, 624, 107, 119, 114, 123, 112, 132, 135, 290, 291–292, 465, 397, 378

[56] References Cited

U.S. PATENT DOCUMENTS

| | | | |
|---|---|---|---|
| 5,246,294 | 9/1993 | Pan | 384/119 |
| 5,423,612 | 6/1995 | Zang | 384/119 |
| 5,487,608 | 1/1996 | Leuthold et al. | 384/113 |
| 5,524,985 | 6/1996 | Dunfield | 384/100 |
| 5,540,504 | 7/1996 | Cordova et al. | 384/100 |
| 5,580,175 | 12/1996 | Polch et al. | 384/113 |

*Primary Examiner*—Charles A. Marmor
*Assistant Examiner*—Matthew A. Kaness
*Attorney, Agent, or Firm*—Nydegger & Associates; David B. Harrison; Debra A. Chun

[57] ABSTRACT

Particle traps in a hydrodynamic bearing unit prevent particles, generated by repeated motor start and stop operations or lubricant cavitation caused by shock loads or introduced by ambient sources, from circulating with the bearing lubricant, thereby preventing accelerated wear of bearing grooves. Each trap is defined by an annular bevel shaped channel defined along the inner radial wall of a shaft sleeve. Each trap is located in close proximity to hydrodynamic bearings so that existing particles and any wear particles generated by the bearings may be pumped into the traps by centrifugal force created by rotation of the bearing unit and imparted to the lubricant. The centrifuge-like effect forces the particles against the back wall of each channel while the bevel shaped configuration of the channels prevents particles from migrating out of the channels after the motor stops. The configuration and location of the traps eliminate the need for global recirculation of bearing lubricant, thereby reducing the risk of leakage.

22 Claims, 6 Drawing Sheets

HYDRODYNAMIC BEARING HAVING LUBRICANT PARTICLE TRAPS

FIELD OF THE INVENTION

The present invention relates to fluid bearings. More particularly, the present invention relates to a hydrodynamic bearing unit having lubricant particle traps.

BACKGROUND OF THE INVENTION

The development of computer hard disk drives demands ever increasingly higher track density, lower acoustic noise, and better reliability under shock and vibrational disturbances. Certain undesirable characteristics of the currently used ball bearing spindles impose severe limitation on the drive's capacity and performance These characteristics include, for example, high non-repetitive runout, large acoustic noise, and high resonance frequencies due to bearing defect.

The use of a non-contact bearing, such as a hydrodynamic bearing ("HDB"), may overcome the aforementioned undesirable characteristics. The full film lubrication of a fluid bearing displays significantly lower non-repetitive runout and acoustic noise, and its higher damping provides better resistance to external shock and vibration. One example of a disk drive spindle motor including a HDB and centrifugal-capillary seals is found in commonly-assigned U.S. Pat. No. 5,423,612 entitled: "Hydrodynamic Bearing and Seal", the disclosure thereof being incorporated herein by reference.

The deployment of the HDB system in a hard disk drive environment requires that the lubricant be securely sealed inside of the bearing structure under all operating and non-operating conditions in order to prevent lubricant leakage otherwise resulting in performance degradation of the bearing and contamination inside the drive. In addition, it is necessary that bearing lubricant be maintained with a minimum amount of loose particles. Particles in the lubricant may originate from ambient environment or may be generated by contact between moving surfaces during operation. Generally, wear particles are generated in the bearing areas during motor start and stop. The inventor of the present invention have observed wear particles in bearing lubricant, after many bearing star/stop operations, which have a nominal dimension of approximately 0.1–5 microns. Such particles, under 1860× magnification, exhibit relatively jagged edges. Wear particles tend to generate when two members of differing hardnesses contact each other, e.g. a journal bearing defined between a bronze sleeve and a stainless steel shaft. In studies performed by the present inventor, the observed particles were determined to be mostly bronze, which suggests that the particles have been generated by contact between a bronze surface of the sleeve and a harder surface, e.g. stainless steel of the shaft. In either case, particles are detrimental to hydrodynamic bearing operation. Since bearings typically have a clearance of approximately 5 to 10 microns, particles in the lubricant may act as abrasive ingredients and cause accelerated wear of groove patterns in the bearing and eventually failure of the bearing.

Prior art approaches for providing particle traps in hydrodynamic bearings have placed such traps in the recirculation port instead of the bearing clearance and at a location far away from the journal and thrust bearings and relied on global lubricant recirculation to move particles into the trap.

One example is found in commonly assigned U.S. Pat. application Ser. No. 08/525,298 to Polch et al., entitled: "Bearing with a Particle Trap". In this HDB 100, shown in FIG. 2, an internal radial particle trap 29 is provided in the bearing sleeve 25, between the sleeve and the bushing 23 for storing lubricant and collecting particles. This approach relies on global lubricant recirculation to pump particles into the trap, since the trap is located in the recirculation port away from the bearings. The limitation of this approach is that it is only effective in trapping particles in bearing designs using grooves which generate global recirculation. One drawback of global recirculation is that it creates net axial lubricant movement, which may increase the risk of leakage. Another limitation of the Polch et al. approach is that the trap is located so remotely from the journal and thrust bearings, where particles are most likely to be generated, that without global recirculation, particles generated by the bearings may not be effectively pumped into the trap.

Centrifugal force imparted to the bearing lubricant has been exploited as a control mechanism for driving lubricant towards the outer periphery of a bearing unit. For example, U.S. Pat. No. 5,246,294 to Pan, entitled "Flow-Regulating Hydrodynamic Bearing" discloses the use of centrifugal force to pump bearing fluid trapped in a clearance seal toward a lubricant reservoir located at an outer periphery of the bearing unit, thus preventing leakage. Since the level of centrifugal force in a typical disk drive spindle (based on 5,400 rpm and a 2 mm radius) is over 30 g's, this force provides a very powerful control mechanism. However, centrifugal force has not heretofore been harnessed to entrap lubricant particles., when global recirculation is not present.

Thus, a hitherto unsolved need has remained for a hydrodynamic bearing unit which uses centrifugal force to more effectively pump particles into traps and which does not rely on global lubricant recirculation to entrap the particles.

SUMMARY OF THE INVENTION WITH OBJECTS

A general object of the present invention is to provide a hydrodynamic bearing unit having particle traps which overcome limitations and drawbacks of the prior art.

More specifically, it is an object of the present invention to provide a bearing unit having particle traps which do not rely on global lubricant recirculation to pump particles into the traps.

Another object of the present invention is to provide a hydrodynamic bearing unit having particle traps which are located in close proximity to the bearings.

To achieve the foregoing objects, disclosed herein is a hydrodynamic bearing unit having particle traps located in close proximity to the journal bearings and thrust bearings. As the bearing unit rotates, the bearing lubricant, may be contaminated with wear particles generated by the bearings. Rotation of the bearing unit generates centrifugal force in the lubricant, creating a centrifuge-like effect in the lubricant, such that any particles in the lubricant are pumped into the particle traps. The close proximity of the traps to the bearings enables any particles to be pumped away from the bearings and reduces the possibility of particles recirculating with the lubricant.

In one embodiment particle traps are defined by annular bevel shaped channels. The bevel shape reduces the possibility of particles migrating out of the traps after the bearing unit has stopped rotating. Each trap is defined along the inner radial walls of an inner sleeve which is concentric about a shaft, and an outer sleeve concentric about the inner sleeve.

In another embodiment, two journal bearing particle traps are located along the inner radial wall of the inner sleeve, each trap being axially adjacent a journal bearing. In addition, two thrust bearing particle traps are located along the inner radial wall of the outer sleeve, each trap being radially adjacent a thrust bearing. A fifth trap is additionally located along the inner radial wall of the outer sleeve, at the opposite end of the thrust bearing traps, and radially adjacent one of the journal bearings.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

The details of construction of HDB's in which the invention finds utility, are well known to those skilled in the art. Specifically, the assembly and function of HDB components other than those described herein below are discussed in commonly-assigned U.S. patent application Ser. No. 08/519, 842, entitled, "Hydrodynamic Bearing for Spindle Motor Having High Initial Load", the disclosure thereof being incorporated herein by reference. As a result the following description omits describing conventional details of HDB structure and assembly methods other than as related to the best mode of the present invention, and as to enable those skilled in the art to practice the present invention.

Figure 2:
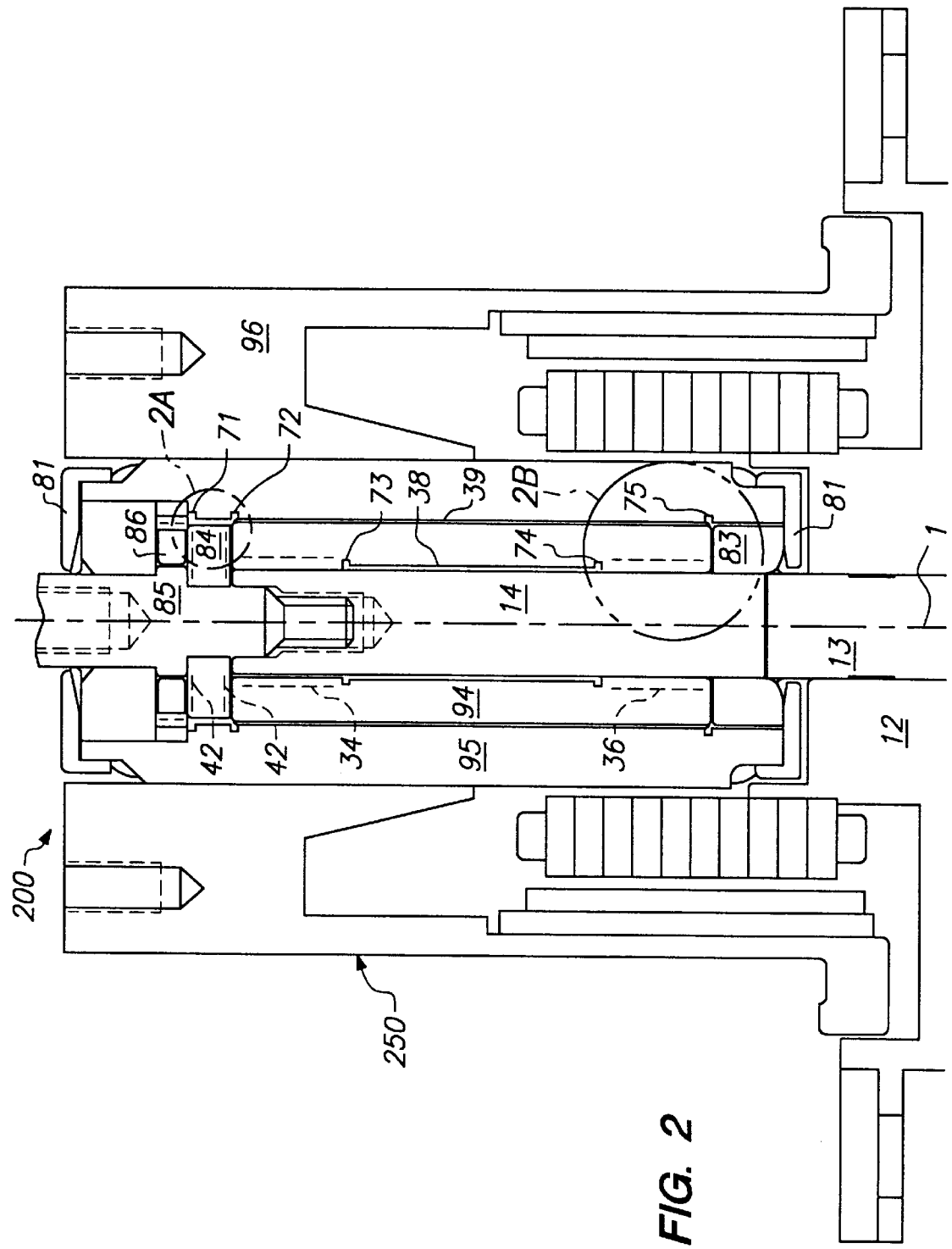
FIG. 2 is an enlarged view in elevation and section of one embodiment of a self contained HDB unit including a plurality of particle traps in accordance with principles of the present invention.

One preferred embodiment of an HDB unit 200 incorporating principles of the present invention is shown in FIG. 2, mounted in a motor assembly 250, and includes a steel alloy shaft 14 having a lower portion 13 which is press or shrink fit into a base 12. Lower portion 13 has a diameter smaller than shaft 14, enabling bottom seal plate 83 to be freely inserted and press fit onto shaft 14 during HDB unit 200 assembly. The shaft 14 is concentric about a longitudinal axis of rotation 1. A bronze inner sleeve 94 fits concentrically over the steel shaft with a close clearance tolerance and defines two axially spaced apart hydrodynamic journal bearings 34 and 36 therein between. The journal bearings 34 and 36 may be defined either in the inner diameter wall of the inner sleeve 94 or in the outer wall of the shaft 14, depending on the application, and are further defined by pumping grooves which are designed to provide adequate radial stiffness and damping (not shown) In one preferred embodiment, the grooves are defined by a herringbone pattern. The pumping grooves are designed such that there is no net axial lube movement under nominal design parameters.

Figure 2A:
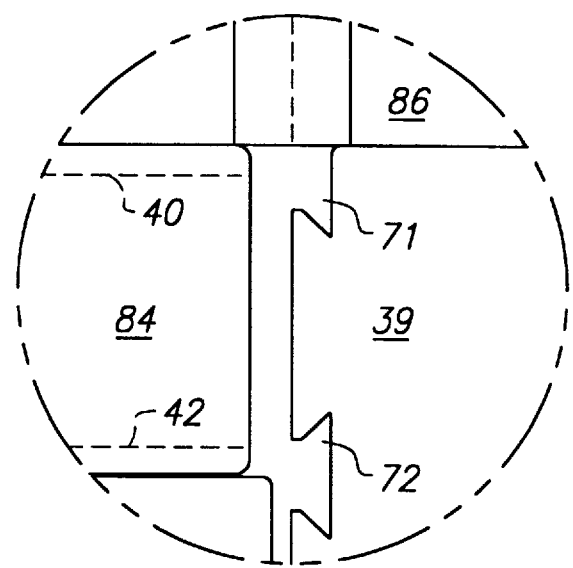
FIG. 2A is a magnified view of the detailed portion of FIG. 1, showing the thrust bearing particle traps in accordance with the principles of the present invention.
Figure 2B:
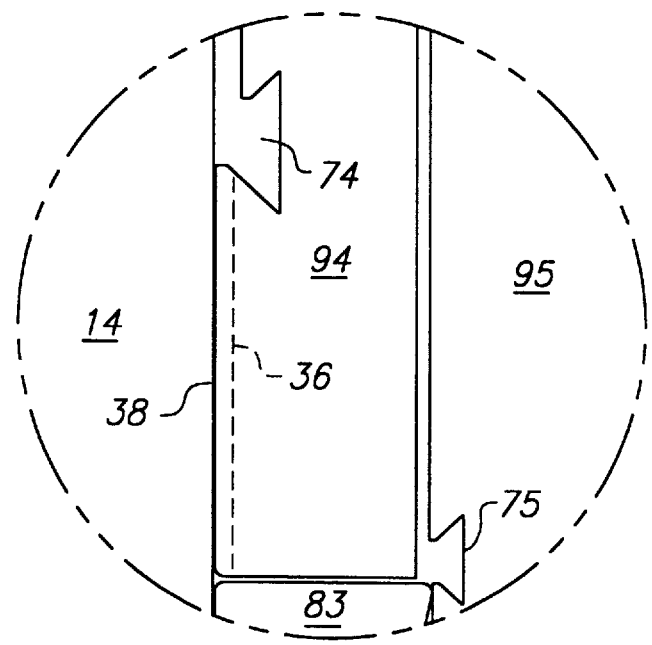
FIG. 2B is a magnified view of the detailed portion of FIG. 1, showing a journal bearing particle trap and the auxiliary bearing particle trap in accordance with the principles of the present invention.
Figure 4:
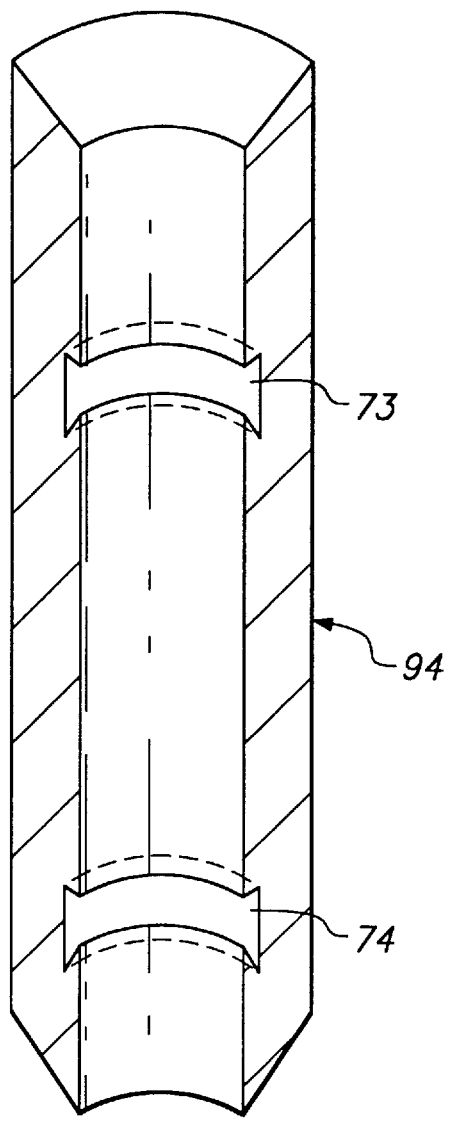
FIG. 4 is an isometric view in elevation and section of the inner sleeve, showing the journal bearing particle traps.

Located at the top and bottom of the journal bearing reservoir 38, radially adjacent to the journal bearings 34 and 36, are two journal bearing traps, 73 and 74. As shown in FIG. 4, the traps 73 and 74 are annular channels defined along the inner wall of the inner sleeve 94. FIG. 2B provides a detailed illustration of the configuration of particle trap 74 and its close proximity to journal bearing 36. The close proximity of the traps 73 and 74 to the journal bearings 34 and 36, enable particles to be pumped into the traps 73 and 74 by centrifugal force. In a preferred embodiment shown in FIG. 2B, the annular channels defining the traps are bevel shaped, which helps to entrap particles after the bearings stop rotating.

An annular thrust plate 84, e.g. of steel alloy, as shown in FIG. 2, is secured onto the shaft 14 by shaft-bolt 85. Upper and lower hydrodynamic axial thrust bearings 40 and 42 may be defined either on the radial faces of thrust plate 84 or on the upper and lower radial faces of the inner sleeve 94 and a bronze thrust bushing 86, respectively, with typical nominal clearances of approximately 10 microns. The thrust bearings 40 and 42 are further defined by pumping grooves, preferably herringbone pattern, designed to provide adequate axial bearing stiffness and damping.

Figure 5:
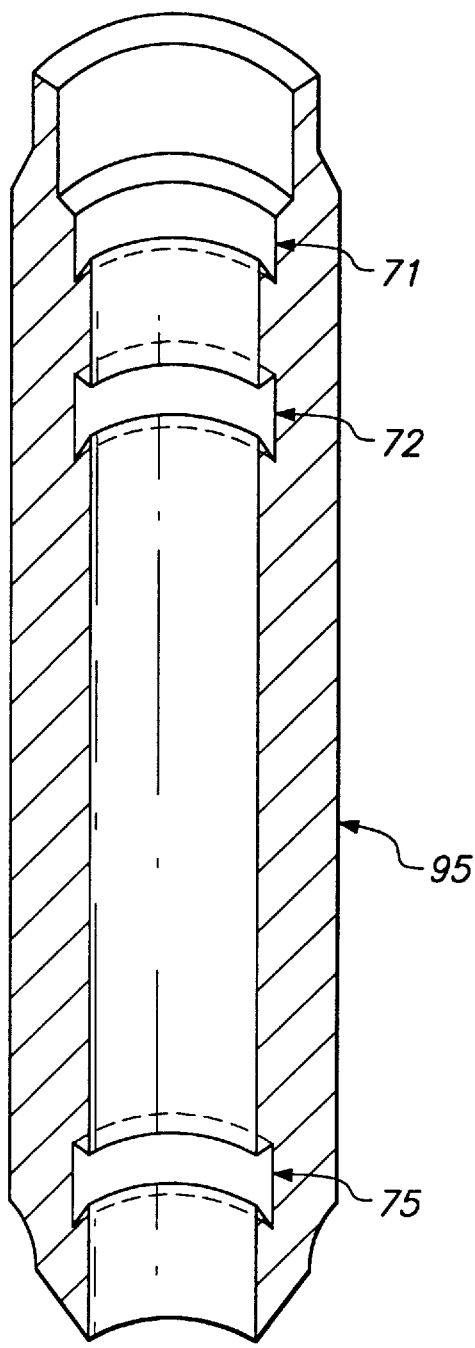
FIG. 5 is an isometric view in elevation and section of the outer sleeve, showing the thrust bearing particle traps and the auxiliary bearing particle trap.

Also shown in FIG. 2, a bronze outer sleeve 95 fits concentrically over the inner sleeve 94, defining one or more recirculation port 39 there between, which is in substantial radial alignment with thrust bearing particle traps 71 and 72 and bottom particle trap 75, defined on the inner radial wall of outer sleeve 95. Traps 71 and 72 are located below an inner annular recess therein, and radially adjacent the outer radial wall of thrust plate 84. As shown in FIG. 5, traps 71, 72 and 75 are defined by annular channels along the inner radial wall of outer sleeve 95. In a preferred embodiment shown in FIG. 2A, the annular channels defining traps 71 and 72 are bevel shaped, which enable particles to be entrapped, after the bearing stops rotating. As also shown FIG. 2, traps 71 and 72 are located radially adjacent to thrust bearing 40 and 42. Traps 71 and 72 are further located at an outer periphery from thrust bearings 40 and 42, enabling lubricant and particles to be pumped into the traps 71 and 72 by centrifugal force.

Returning to FIG. 2B, auxiliary particle trap 75 is also defined by an annular bevel shaped channel and located radially adjacent journal bearing 36. Auxiliary trap 75 is further located at an outer periphery from journal bearing 36 enabling particles to be pumped into trap 75 by centrifugal force.

During operation, the clearances between the shaft 14 and inner sleeve 94, the inner sleeve 94 and the outer sleeve 95, the thrust plate 84 and the inner sleeve, outer sleeve and thrust bushing 86 are filled with a lubricant. The HDB unit 200 is sealed by taper capillary seals formed by seal plates 87 and 83 with outer sleeve 95 and by containment rings 81 adhesively attached at both ends of the unit, and housed within a motor hub 96. As the HDB unit 200 starts and stops, particle matters may be generated by the bearings and introduced into the lubricant. Rotation of the thrust bushing 86 and sleeves 94 and 95 create centrifugal force which is imparted to the lubricant, resulting in a centrifuge-like effect on the particles. Since the traps are located at a radial position outside the bearing, centrifugal force pumps any particles, e.g. generated by relative movement of bearing surfaces, into adjacent traps, against the back wall. In addition, axial lubricant movement may be generated between the shaft 14 and the inner sleeve 94, transporting the lubricant and any particles toward traps 73 and 74. To assist in particle retention, the surface of the channels may be formed with a roughened finish.

As the motor stops, and the lubricant becomes stagnant, particles pumped into the traps remain entrapped in the bevel shaped channels. As shown in FIG. 2A and 2B, jagged edged particles should either attach itself to the back wall or settle into the lower half of the bevel channel. In the rare event that particles migrate or diffuse outside the traps, the subsequent motor start will pump any diffused particles back into the traps. Thus each trap provides an inlet for channeling particles away from bearings and entrapping the particles therein.

Figure 1:
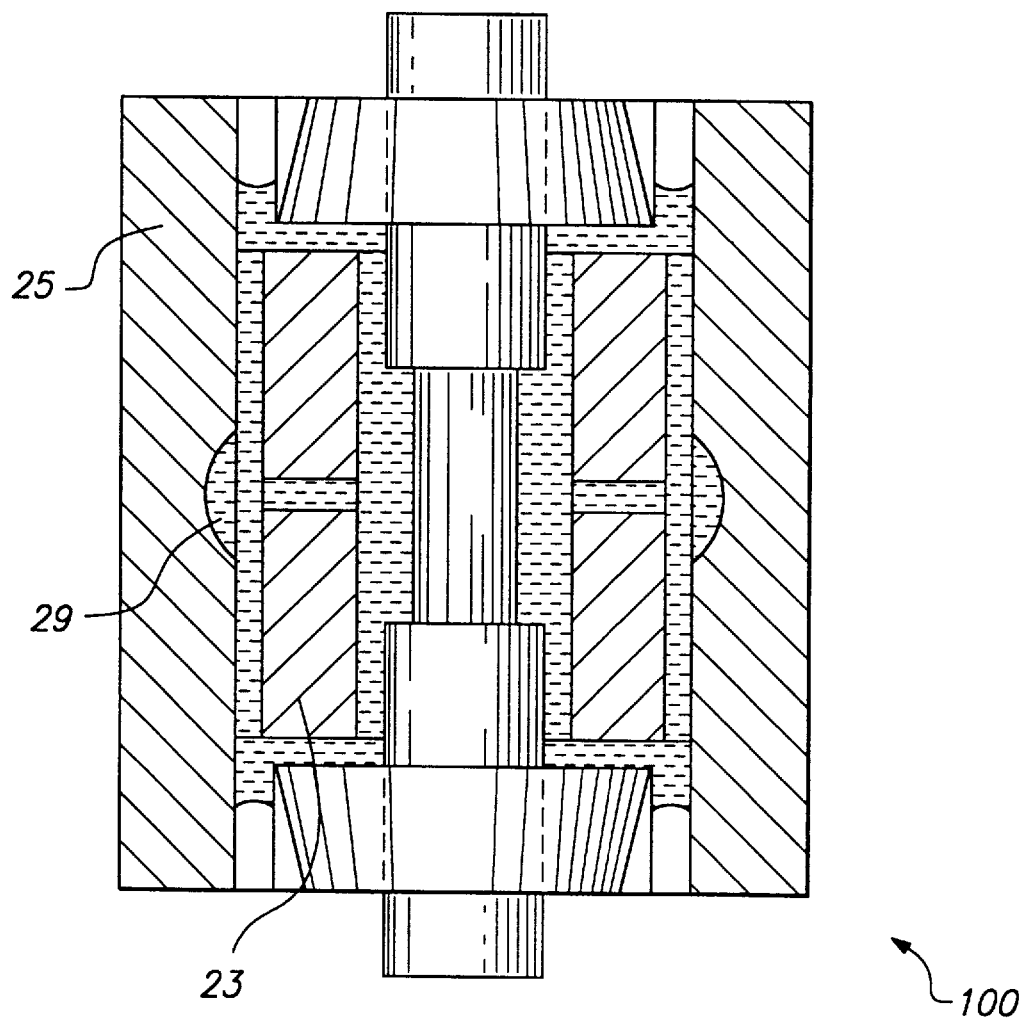
FIG. 1 is an enlarged view in section and elevation of a prior self contained hydrodynamic bearing unit having an internal radial chamber in the bearing sleeve, between the sleeve and the bushing for collecting particles.
Figure 3:
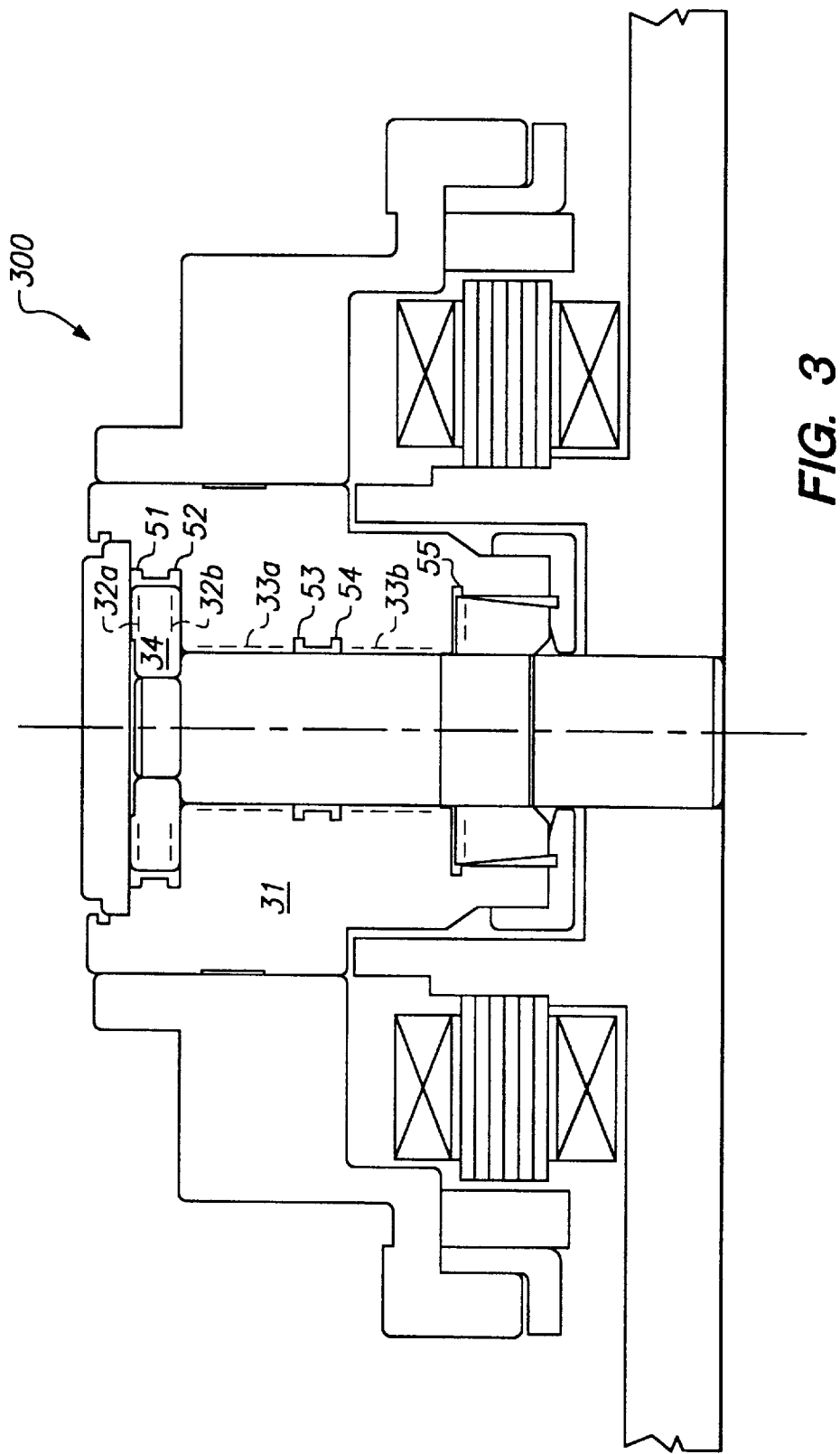
FIG. 3 is an enlarged view in elevation and section of another embodiment of a self contained HDB unit in accordance with principles of the present invention.

FIG. 3 illustrates another embodiment of a self contained HDB spindle unit 300 incorporating principles of the present invention. In this single seal cantilevered HDB motor 300, particle traps 51, 52, 53, 54 and 55 are all defined in bronze sleeve 31. Journal bearings 33a and 33b are defined at an inner diameter of sleeve 31 and includes pumping grooves defined therein, preferably a herringbone pattern, similar to those described in HDB unit 200 of FIG. 2. Thrust bearings 32a and 32b are defined on upper and lower radial faces of thrust plate 34 and includes pumping grooves defined therein, preferably herringbone pattern, similar to those described in FIG. 1. Traps 51 and 52 are located radially adjacent to thrust bearings 32a and 32b, enabling particles generated from these two bearing to be pumped into traps 51 and 52 by centrifugal force. Traps 53 and 54 are located axially adjacent to journal bearings 33a and 33b, enabling particles generated by these journal bearings to be similarly pumped into traps 53 and 54 by centrifugal force. Trap 55 is located in close proximity to journal bearing 33b to further trap particles circulating at the lower portion of the unit 300.

Figure 6:
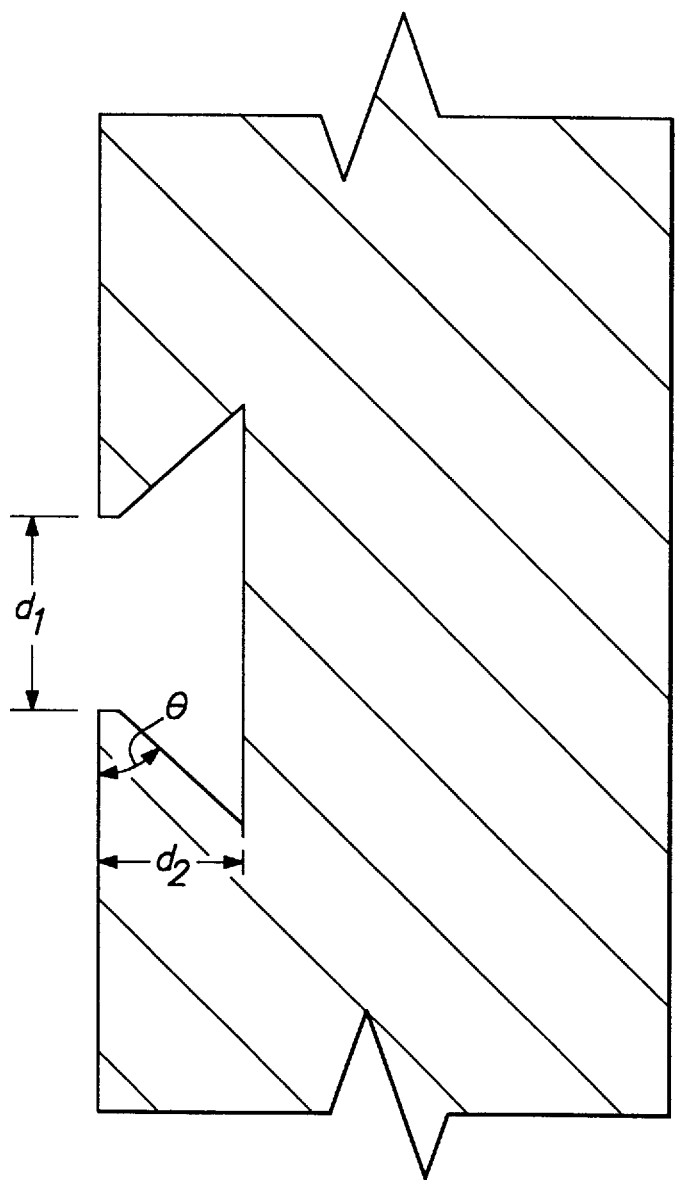
FIG. 6 is a sectional view of a portion of a sleeve, including a particle trap, illustrating the three dimensions which define a particle trap.

Each trap may be defined by the bevel angle θ, the channel opening $d_1$ and the channel depth $d_2$, as illustrated in FIG. 6. Various factors should be considered when determining the actual size and shape of each of the aforementioned particle traps, including: 1) The radial dimension of the trap must be deep enough for centrifugal force to create significant pumping effect as well as having a volume suffcient to capture particles; 2) The trap must be volumetrically small enough so that the added lubricant does not impact the fluid dynamics and thermal characteristics of the lubricant in the bearing unit; 3) The shape of each trap must enable ease of machining while at the same time prevent trapped particles from migrating while the motor is non-operational, 4) The channel opening must be wide enough for particles to enter. Those skilled in the art will understand that determining the actual size and dimensions of each trap is not limited to the above mentioned factors. In the preferred embodiment shown in FIG. 1, each particle trap is formed with a beveled angle θ=45 degrees, an opening $d_1$=0.2 mm, and a depth $d_2$=0.2 mm. Traps of the aforementioned dimensions have been found to exhibit sufficient volume to entrap particles without disturbing the performance of the lubricant. Those skilled in the art will also understand that traps of other sizes may be realized depending on the application and various factors including the factors discussed above.

As used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A hydrodynamic bearing assembly comprising:
   a shaft;
   a sleeve including an opening for receiving at least a portion of the shaft and allowing for relative rotation between the shaft and the sleeve;
   a lubricant positioned within the opening in the sleeve, the relative rotation between the sleeve and the shaft generating and imparting a centrifugal force to the lubricant;
   a hydrodynamic journal bearing defined between at least a portion of the shaft and at least a portion of the sleeve; and
   a journal particle trap mounted in the sleeve for receiving and entrapping particles which may exist in the lubricant proximate the journal bearing, the journal particle trap including a journal trap inlet which is positioned adjacent to the journal bearing, so that the particles and lubricant exiting the hydrodynamic journal bearing are forced directly into the trap by the centrifugal force imparted by the relative rotation of the sleeve and the shaft wherein the particle trap, including the trap inlet, is defined by a substantially annular channel which is beveled, so that a width of the channel is smallest approximate to the trap inlet.

2. The hydrodynamic bearing assembly of claim 1 wherein the journal trap inlet includes a substantially annular shaped channel which substantially encircles the shaft.

3. The hydrodynamic bearing assembly of claim 2 wherein the journal trap inlet is positioned substantially radially from a longitudinal axis of the shaft so that the centrifugal force directs a portion of the lubricant towards the journal trap inlet.

4. The hydrodynamic bearing assembly of claim 1 wherein the journal particle trap is positioned within an inner diameter wall of the sleeve.

5. The hydrodynamic bearing assembly of claim 1 wherein the journal particle trap, including the journal trap inlet, is defined by an annular channel.

6. The hydrodynamic bearing assembly of claim 5, wherein, substantially the entire annular channel is beveled so that the width of the channel is smallest proximate to the journal trap inlet.

7. The hydrodynamic bearing assembly of claim 11 including:

a thrust plate secured to the shaft;

a hydrodynamic thrust bearing defined between a shoulder portion of the sleeve and a portion of the trust plate; and a thrust particle trap for receiving and entrapping particles which may exist in the lubricant proximate the thrust bearing, the thrust particle trap including a thrust trap inlet which is positioned proximate the thrust bearing, so that the particles and lubricant exiting the hydrodynamic thrust bearing are forced directly into the trap by the centrifugal force imparted by the relative rotation of the shaft and the thrust plate.

8. The hydrodynamic bearing assembly of claim 7 wherein the thrust trap inlet for the thrust particle trap is a substantially annular channel which substantially encircles the thrust bearing.

9. The hydrodynamic bearing assembly of claim 7 wherein the thrust particle trap, including the thrust trap inlet, is defined by an annular channel which is beveled so that the width of the channel is smallest proximate to the thrust trap inlet.

10. The hydrodynamic bearing assembly of claim 11 including a second hydrodynamic journal bearing defined between a portion of the shaft and a portion of the sleeve and a second journal particle trap for receiving and entrapping particles which may exist in the lubricant proximate the second journal bearing, the second journal particle trap including a second journal trap inlet which is positioned adjacent to the second journal bearing so that the particles and lubricant exiting the second hydrodynamic journal bearing are forced directly into the second trap by a centrifugal force imparted by the relative rotation of the sleeve and the shaft.

11. The hydrodynamic bearing assembly of claim 10 including:

a pair of spaced apart hydrodynamic thrust bearings; and a pair of thrust particle traps for receiving and entrapping particles which may exist in the lubricant proximate the thrust bearings, each thrust particle trap including a thrust trap inlet which is a substantially annular channel which substantially encircles one of the thrust bearings so that the particles and lubricant exiting the hydrodynamic thrust bearing are forced directly into the trap by a centrifugal force imparted by the relative rotation proximate to the thrust bearing.

12. A hydrodynamic bearing assembly comprising:

a shaft;

a thrust plate secured to the shaft;

a sleeve including an opening for receiving at least a portion of the shaft and allowing for relative rotation between the thrust plate and the sleeve;

a hydrodynamic thrust bearing defined between a shoulder portion of the sleeve and at least a portion of the thrust plate;

a lubricant positioned between the sleeve and the thrust plate, the relative rotation between the sleeve and the thrust plate generating and imparting a centrifugal force to the lubricant; and a thrust particle trap mounted in the sleeve for receiving and entrapping particles which may exist in the lubricant proximate the thrust bearing, the thrust particle trap including a thrust trap inlet which is positioned proximate the thrust bearing, so that the particles and lubricant exiting the thrust bearing are directly forced into the trap by the centrifugal force imparted by the relative rotation between the shaft and the thrust plate wherein the particle trap, including the trap inlet, is defined by a substantially annular channel which is beveled, so that a width of the channel is smallest approximate to the trap inlet.

13. The hydrodynamic bearing assembly of claim 12 wherein the thrust trap inlet is a substantially annular shaped channel which substantially encircles the thrust bearing.

14. The hydrodynamic bearing assembly of claim 12 wherein the thrust particle trap, including the thrust trap inlet, is defined by an annular channel which is beveled, so that the width of the channel is smallest proximate to the thrust trap inlet.

15. The hydrodynamic bearing assembly of claim 12 including a second hydrodynamic thrust bearing and a second thrust particle trap for receiving and entrapping particles which may exist in the lubricant proximate the second hydrodynamic thrust bearing, the second thrust particle trap including a second thrust trap inlet which is positioned proximate the second hydrodynamic thrust bearing and which substantially encircles the thrust bearing, so that the particles and lubricant exiting the second hydrodynamic thrust bearing are directly forced into the trap by the centrifugal force imparted by the relative rotation at the second hydrodynamic thrust bearing.

16. The hydrodynamic bearing assembly of claim 12 including a hydrodynamic journal bearing defined between a portion of the shaft and a portion of the sleeve and a journal particle trap for receiving and entrapping particles which may exist in the lubricant proximate the journal bearing, the journal particle trap including a journal trap inlet which is positioned adjacent to the journal so that the particles and particles exiting the hydrodynamic journal bearing are forced directly into the trap by the centrifugal force imparted by the relative rotation at the journal bearing.

17. The hydrodynamic bearing assembly of claim 16 including a second hydrodynamic journal bearing defined between a portion of the shaft and a portion of the sleeve and a second journal particle trap for receiving and entrapping particles which may exist in the lubricant proximate the second hydrodynamic journal bearing, the second journal particle trap including a second journal trap inlet which is positioned adjacent to the second hydrodynamic journal bearing and which substantially encircles the shaft, so that the particles and lubricant exiting the second hydrodynamic journal bearing are directly forced into the trap by a centrifugal force imparted by the relative rotation at the second journal bearing.

18. A hydrodynamic bearing assembly comprising:

a shaft including a thrust plate secured thereto;

a sleeve including an opening for receiving at least a portion of the shaft and allowing for relative rotation between the shaft and the sleeve;

a lubricant positioned within the opening in the sleeve, the relative rotation between the sleeve and the shaft generating and imparting a centrifugal force to the lubricant;

a first hydrodynamic bearing defined between a portion of the shaft and a portion of the sleeve;

a first particle trap mounted in the sleeve for receiving and entrapping particles which may exist in the lubricant proximate the first hydrodynamic bearing, the first particle trap including a first trap inlet defined by a substantially annular shaped channel which substantially encircles the shaft, and positioned so that the particles and lubricant exiting the hydrodynamic bearings are forced directly into the trap by the centrifugal force imported at the first hydrodynamic bearing; and wherein the first particle trap, including the first trap inlet, is defined by a substantially annular channel which is beveled, so that a width of the channel is smallest proximate to the first trap inlet.

19. The hydrodynamic bearing assembly of claim 18 wherein the first hydrodynamic bearing is a journal bearing defined between a portion of the shaft and a portion of the sleeve.

20. The hydrodynamic bearing assembly of claim 18 wherein the first hydrodynamic bearing is a thrust bearing defined between a shoulder portion of the sleeve and at least a portion of the trust plate and the first trap inlet substantially encircles the thrust bearing.

21. The hydrodynamic bearing assembly of claim 18 including a second, hydrodynamic bearing defined between a portion of the shaft and a portion of the sleeve and a second particle trap for receiving and entrapping particles which may exist in the lubricant proximate the second hydrodynamic bearing, the second particle trap including a second trap inlet having a substantially annular shaped channel which substantially encircles the shaft, the trap inlet being positioned so that the particles and lubricant exiting the second hydrodynamic bearing are forced directly into the trap by the centrifugal force caused by the relative rotation at the second hydrodynamic bearing.

22. A method of entrapping particles which may exist in a hydrodynamic bearing assembly, the bearing assembly including a shaft, a sleeve including an opening for receiving at least a portion of the shaft, a lubricant positioned within the opening in the sleeve, and a hydrodynamic journal bearing defined between a portion of the shaft and a portion of the sleeve, the method including the steps of:

positioning a journal trap inlet of a journal particle trap mounted in the sleeve substantially adjacent to the journal bearing, the journal trap inlet being defined by a substantially annular shaped channel which substantially encircles the shaft, the channel being beveled, so that a width of the channel is smallest proximate to the trap inlet; and imparting a centrifugal force upon the lubricant by rotating the sleeve relative to shaft, the centrifugal force tending to urge at least a portion of the lubricant and particles from proximate the journal bearing directly into the journal trap inlet wherein the particule trap, including the trap inlet, is defined by a substantially annular channel which is beveled, so that a width of the channel is smallest approximate to the trap inlet.

* * * * *